United States Patent
Fischbach

[15] 3,640,148
[45] Feb. 8, 1972

[54] RETAINER CAP FOR A STARTER PINION

[72] Inventor: Ronald Fischbach, 2045 East 21st St., Brooklyn, N.Y. 11219

[22] Filed: Oct. 12, 1970

[21] Appl. No.: 79,900

[52] U.S. Cl. .................................74/434, 74/8, 287/52.06, 287/53 SS, 287/52 R
[51] Int. Cl. ...................F16h 55/04, B60b 27/06, F16d 1/06
[58] Field of Search ....................74/434, 8, 139; 287/52.06, 287/53 SS, 52 R

[56] References Cited

UNITED STATES PATENTS 1,589,459  6/1926  Brockway ...................................74/8

Primary Examiner—Leonard H. Gerin
Attorney—William T. Hough

[57] ABSTRACT

A retainer cap for retaining a rotatable pinion, the lockable roller bearings and associated springs, of an automobile starter shaft and pinion mechanism, the top of the cap having centrally located therein an aperture defined by the cap's aperture inside perimeter in a shape corresponding to a transverse cross section across the automobile starter pinion such that the aperture inside perimeter includes between radially outwardly extending cutout spaces, radially inwardly directed projections corresponding to the shape of spaces between teeth of the starter pinion, whereby the retainer cap is placeable into a retaining position by snug insertion of the teeth through the scalloped spaces, thereby eliminating the need for the prior art retainer annular washer and two half moon retainer rings.

10 Claims, 3 Drawing Figures

PATENTED FEB 8 1972 3,640,148
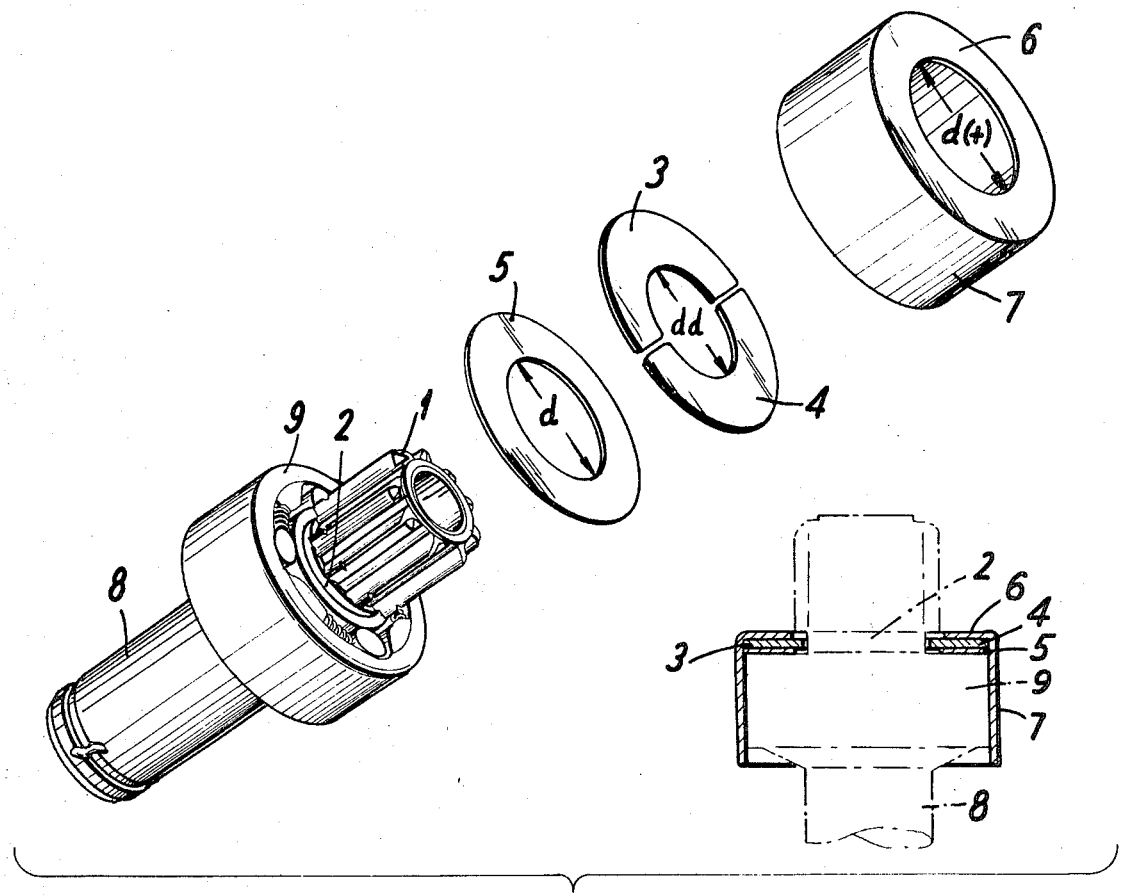
FIG.I (PRIOR ART)
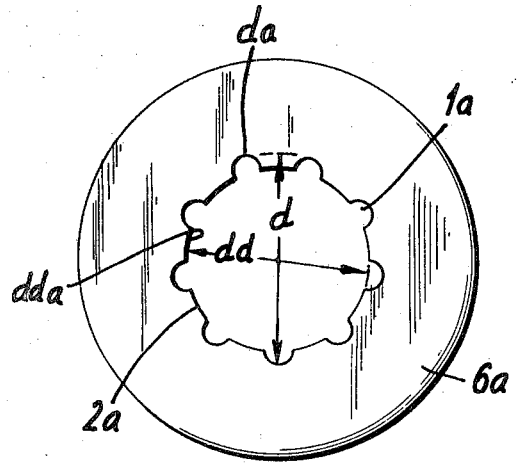
FIG.IIA
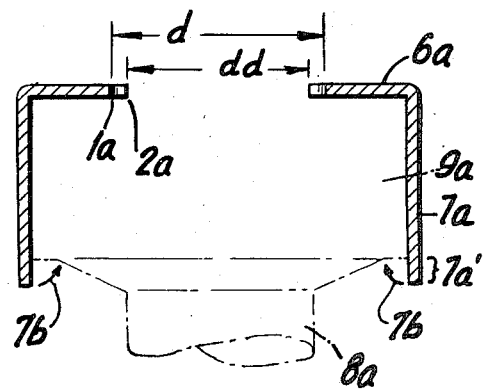
FIG.IIB
INVENTOR.
RONALD FISCHBACH
BY William T. Hough
ATTORNEY

RETAINER CAP FOR A STARTER PINION

This invention is directed to an automobile retainer cap which obviates the need of multiple parts such as the formerly necessary combination of prior art retainer cap, annular retainer washer, and two retainer half moon washers.

BACKGROUND

FIG. I illustrates a typical automobile starter annular shaft 9 having rotatably mounted therein a pinion shaft including a pinion base and continuous with the pinion base a pinion, the FIG. IA illustrating the annular shaft 9 having mounted therein the pinion base of the pinion shaft, the lockable roller bearings against the annular pinion base, and the springs acting against the bearings mounted around the annular pinion base, the retaining annular washer 5, two half moon washers 3 and 4, and a retainer cap 7 having in its top 6 a symmetrically circular hole of diameter "$d(+)$"(i.e., $d$(plus) ) which is at least greater than the outside diameter of the annular pinion base and of the pinion—as measured between the tooth extremities of opposite sides of the pinion. To prevent the bearing-encompassed annular pinion base (as well as the bearings and their respective springs) from working out of the annular shaft 9, heretofore the retainer washer 5 was slid down around the pinion to the nontoothed base of the pinion to loosely rest on about the top of the annular shaft 9 and retaining the various members to be retained; the two half moon washers 3 and 4 were then inserted from opposite directions lockingly beneath the teeth, around the nontoothed pinion shaft restrainingly on top of the restraining washer 5. The outside diameter of the inserted half moon washers 3 and 4 is about the same as the outside diameter of the annular shaft 9. The snugly fitting cap 7 was then slid down around the pinion 1 and around the annular shaft 9 as illustrated in FIG. I cross-sectional view, the inner face of the top 6 and the cylindrical inner walls of the cap 7 jointly serving to prevent the locking half moon washers from slipping radially outwardly to a nonlocking position; however, to prevent the cap from being worked upwardly (as well as eventually all of the retained parts) during operation, the cap 7 must be locked onto the annular shaft 9 by any desirably convenient or conventional means. Typically the cap 7 is locked onto the annular shaft 9 by bending radially inwardly the lower edges of the cap's rim to a grasping position against the underside of the shaft 9. Annular shaft 8 is an extension (of lesser diameter) of the annular shaft 9. Although as shown in FIG. I perspective expanded view the pinion 1 and the pinion base, as well as the shaft 9 and its extension 8 are all annular with a continuous channel extending through them all, the channel is not illustrated in FIG. I cross-sectional view because the channel is not relevant to the invention illustrated in FIGS. IIA and IIB described below.

SUMMARY OF THE INVENTION

An object of this invention is a retainer-cap for retaining a pinion and its base, together with the bearings and bearing-springs around the pinion-base within the cylindrical shaft 9.

Another object is to eliminate the need for multiple parts such as a retainer washer 5, half moon washers 3 and 4, and the accompanying retainer cap heretofore employed.

Another object is to reduce the time-consuming labor procedure of having to keep track of several separate parts and the formerly necessary procedure of carefully mounting the parts in the correct order and holding in proper position while placing thereon the retainer cap and sealing the cap while still maintaining the necessary minimal pressure to prevent the retainer half moon washers from getting out of proper and/or locking alignment.

Other objects become apparent from the preceding and following disclosure.

One or more objects of this invention are fulfilled by a retainer cap typically of the same shape as prior art caps except that instead of having the large hole in the upper face thereof, the novel cap of this invention has a hole having a configuration such that projections arranged around the periphery of the hole extend radially inwardly at predetermined sites sufficiently to extend between the pinion teeth but concurrently allow sufficient distance (space) between the terminal ends of the projections of opposing sides of the perimeter for insertion of the pinion shaft from which the teeth extend, whereby the spaces between the projections permit the cap to be slipped down over (around) the teeth to the top of the pinion base while the projections themselves when they reach the pinion base serve to retain all parts formerly retained solely by a plurality of parts discussed relative to FIG. I, as soon as the lower lips of the novel retainer cap rim are bent under the edges of the shaft 9 to prevent the cap from working upwardly. Thereby the need for the prior art retainer washer 5, and the prior art retainer half moon washers 3 and 4 is eliminated. By the invention, the former need for multiple parts and multiple steps of assembling, both being costly, are eliminated.

THE FIGURES

FIG. I already discussed above represents prior art retainer washer, two retainer half moon washers, and the retainer cap, together with the pinion and its base and the mounting shaft therefor. It should be noted that the FIG. I cross-sectional view is a longitudinal schematic view serving solely to illustrate the relationship of the prior art retainer ring, two half moon retainer washers, and the retainer cap in relation to the shaft 9 and the pinion shaft (and its teeth); the FIG. I cross-sectional view does not serve to illustrate the fact that in the arrangement as illustrated in FIG. I perspective expanded view that the pinion and pinion base are separate from and mounted in a hollow shaft 9.

FIG. IIA illustrates a top plan view of a typical retainer cap of this invention.

FIG. IIB illustrates a transverse section through the retainer cap of FIG. IIA and additionally illustrates the relative position of the shaft mounted within the retainer cap.

DETAILED DESCRIPTION OF THE INVENTION

In detailed reference to the prior art FIGS IA and IB, these prior art figures facilitate an understanding of the invention of FIGS. IIA and IIB.

In FIG. I, there is disclosed a rotatable shaft 9 having a smaller extension thereof 8 both of which are annular, with a separate pinion and pinion base (also annular) mounted within the cup-shaped annular shaft 9 with the pinion base being snugly mounted for unidirectional rotation by virtue of locking bearings and springs therefor mounted circumscribingly around the annular pinion base within the cup of the annular shaft 9. Such a pinion shaft (including the pinion and the pinion base) and shaft 9 typically are employed as a part of an automobile starter mechanism, the locking bearings permitting the pinion base and pinion to be rotated in a direction which when engaged with the automobile motor gears propels the automobile motor to a starting r.p.m. (revolutions per minute), but which when the r.p.m. of the motor exceeds the r.p.m. of the pinion and the pinion base the locking bearings permitting the pinion base and pinion to revolve as propelled by the motor until such time as the shaft 9 and the pinion 1 are moved away from the motor. When the pinion is propelling the motor, both the shaft 9 and the pinion base (and pinion 1) are locked by the lockable bearings for joint rotary movement together. During such a starter operation, in the absence of a retainer mechanism, the pinion 1 as well as the bearings and springs would rapidly workout of their positions within the shaft 9. Accordingly, previously it has been found necessary to slide a retainer ring 5 around the teeth of the pinion 1 down to the shoulder of the pinion base, shoulder of the shaft 9, and on top of the pinion bearings and springs therefor, to thereby retain these members within the shaft 9. Accordingly, the diameter of the ring 5, i.e., the diameter "$d$," was required to be slightly greater than the diameter of the pinion as measured from the distal ends of the teeth on opposite sides of the pinion, this diameter being at least less than diameter $d$ so that the retainer ring 5 so that the retainer ring 5 might slide down around the pinion 1 downwardly to the top of the pinion base beneath the level of the outwardly extending teeth of the pinion 1. In order to lock the retainer ring 5 into a retaining position however, it was necessary to insert two retainer half moon locking washers 3 and 4 (having a diameter dd about the same as the pinion diameter as measured from one valley site between the teeth across the pinion shaft to an opposite valley site between oppositely extending teeth, whereby when the half moon washers 3 and 4 are inserted opposingly beneath the teeth of the pinion 1 but on top of the retainer washer 5, the retainer washer 5 and the members retained by the retainer washer are thereby locked into their respective positions provided that an additional means is provided to hold the locked half moon washers 3 and 4 in their locked positions; accordingly, the prior art employed a retainer cap 7 having a hole in the top 6 thereof of a hole diameter of about $d$ or $d(+)$(i.e., $d$ plus) whereby the cap 7 was slidable down around the pinion 1 to a location where the inner surface of the top 6 would press downwardly upon the locked retainer half moon washers 3 and 4, and the lower rim of the cap 7 would be bent under (not illustrated) the shaft 9 in the direction of shaft 8 to prevent the cap 7 from being removed or from working off thereafter.

According to the invention the top of the cap, i.e., the top 6a of a cap 7a, has a hole therein of a configuration as may be desired but at least having projections 2a extending radially inwardly between cutout portions 1a, with a diameter $dd$ as measured between the opposing terminal ends $dda$ of the projections 2a, and having a diameter of at least $d$ as measured between the outer extremities $da$ of the cutouts 1a; thereby, the projections 2a are shaped to fit between the teeth of a pinion 1 of predetermined shape and number of teeth and the spaces between the projections, i.e., the cutouts 1a, are shaped sufficiently spaciously to receive the respective teeth of the pinion 1. Accordingly, the cap 7a may be slipped down around the pinion 1, but when the cap 7a has reached the top of the pinion-base, the projections 2a serve the function of prior art retainer ring 5 and locking half moon ring-washers 3 and 4 by virtue of the fact that the projections 2a extend radially inwardly to about the same extend as the inside diameter of the half moon locking rings 3 and 4, thereby eliminating the need for such retainer parts. The FIG. IIB discloses the hole in the top 6a with the cutouts 1a having the diameter $d$ for receiving the pinion teeth, and having the projections 2a with a base diameter $dd$ therebetween for the projections 2a to fit between the teeth snugly close to the pinion shaft beneath the teeth. The cap 7a of FIG. IIB fits around the shaft 9a (which corresponds to the FIG. I shaft 9), and the lower edges 7a' of the cap 7a are bendable inwardly in the directions 7b beneath the shaft 9a in the direction of the smaller shaft 8a.

The novel retainer cap 7a may be made of any conventional and/or desireable material(s) such as pure metal, alloy metal, plastic material(s) such as fiberglass, combinations thereof, or the like, provided that the material(s) is (are) substantially rigid—i.e., sufficiently rigid to retain the parts to be retained as already discussed above.

The cap of this invention may be made (manufactured) by the same or a similar procedure as prior art caps typically made by extrusion processes in which a flat piece of metal is extruded to cap shape and a hole punched therein, or by any other convenient, and/or desireable, and/or conventional method.

It is to be also understood that any washer of the shape—illustrated typically by the FIG. IIA—of this invention, may be employed either with or without a downwardly extending rim of the cap; for example, if such a washer were employed with the prior art cap 7, there would nevertheless be eliminated the need for the heretofore additional locking half moon washers 3 and 4, the rimless washer of this invention serving as an improved retainer locking washer 3' and 4' and concurrently an improved washer 5' for example, as a substitute for the prior art washer 5, and washers 3 and 4. However, as discussed above, in a preferred embodiment the top of the cap 7a has the inventive shape thereby eliminating the need for any of the washer 5 and washers 3 and 4, the cap 7a replacing the prior art cap 7. However, also such a rimless washer (of this invention) may employ means other than a retainer cap such as cap 7 to the rimless washer in position, as may be desired and/or conventional. In one alternative, a washer (rimless, of the invention) has as a part of and extending therefrom two or more arms of a length at least slightly greater than the longitudinal length of the shaft 9 (or 9a), whereby the arms are bendable or bent in about a 90° angle to the retainer washer (of this invention) face so as to extend downwardly about flush with the shaft 9 (or 9asurface and be bendable or bent beneath the shaft 9 (or 9a) toward the shaft 8 (or 8a); i.e., the rim need not be a solid rim but alternatively may be a plurality of two or more arms extending downwardly from the top 6a. An advantage of such an embodiment is that such washers having the outwardly extending arms may be easily and readily stamped out of flat sheets or pieces of metal and subjected to a subsequent arm-bending operation, thereby such a process being a low-cost route to producing the desirable retainer cap of this invention.

In a typical retainer cap of this invention, diameter $dd$ is about 0.882 inches, the diameter $d$ is about 1.022 inches, the outside diameter of the cap is about 1.832 inches, the thickness of the cap metal is about 0.035 inches, the height of the rim from the cap is typically about 0.812 inches (as measured from the top 6a to the outer edge of the downwardly extending edge), and as measured from the center of the cap aperture, the projections occur at about 40° (angle) intervals. However, there are many different conventional shaft sizes and pinion sizes, and accordingly there are many different caps and dimensions embodying the inventive concept and spirit of this invention.

Accordingly, while there may be many possible variations of the invention such as for example illustrated above, employing obvious modifications and/or equivalents apparent to a person skilled in this art, such modifications and/or alternative embodiments are nevertheless within the scope of this invention.

I claim:

1. A gear retainer comprising a substantially rigid retainer member having a lower surface of a predetermined shape, shaped to receive and press against a pinion base's shoulder of a predetermined pinion shaft which pinion shaft includes a pinion mounted fixedly at a terminal end of a pinion base mountable revolvably within a second shaft, and said retainer member having extending through said member an aperture, said member's perimeter of said aperture defining a predetermined diameter and size of aperture shape adapted for said aperture to receive an insertable member shaped as substantially a transverse cross section of said pinion of said predetermined diameter and size, said perimeter defining projections extending radially inwardly from opposite edges of said aperture, extendable between teeth of said pinion and defining depressions between said projections sufficiently spacious for receiving said teeth, said diameter and size being sufficiently larger than said pinion's cross section for said pinion to be substantially snugly axially insertable through said aperture between terminal ends of said projections.

2. A gear-retainer according to claim 1, in which said retainer member is substantially a cap-shaped annulus with an inner lower surface about adjacent said aperture being substantially flat and having a rim-ledge extending about downwardly from an outer perimeter of said flat surface when said flat surface is positioned about horizontally.

3. A gear-retainer according to claim 1, in which said aperture's perimeter is substantially circular with said depressions being spaced cutouts substantially corresponding to teeth of said pinion with remaining portions between said cutouts comprising said projections.

4. A gear retainer according to claim 3, in which said cutouts are substantially semicircular in shape.

5. A gear retainer according to claim 4, in which said retainer member is substantially a cap-shaped annulus with said lower surface about adjacent said aperture being substantially flat and having a rim ledge extending about downwardly from an outer perimeter of said flat surface when said flat surface is positioned about horizontally.

6. A gear retainer according to claim 5, including in combination, said pinion shaft and said second shaft, said second shaft having an open terminal end for inserting said pinion base, said second shaft having an outer diameter at least slightly lesser than said annular retainer member's lower surface.

7. A gear retainer according to claim 6, in which said retainer member is a metal.

8. A gear retainer according to claim 1, including in combination, said pinion shaft and said second shaft, said second shaft having an open terminal end for inserting said pinion base, said second shaft having an outer diameter at least slightly lesser than said annular retainer member's lower surface.

9. A gear retainer according to claim 1, including in combination, said pinion shaft and said second shaft.

10. A gear retainer according to claim 1, in which said retainer member is a metal.

* * * * *